United States Patent
Motohashi

(10) Patent No.: US 12,059,915 B2
(45) Date of Patent: Aug. 13, 2024

(54) THERMAL TRANSFER IMAGE RECEIVING SHEET

(71) Applicant: TOPPAN INC., Tokyo (JP)

(72) Inventor: Akira Motohashi, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 18/149,756

(22) Filed: Jan. 4, 2023

(65) Prior Publication Data
US 2023/0147524 A1  May 11, 2023

Related U.S. Application Data

(63) Continuation of application No. PCT/JP2021/025731, filed on Jul. 8, 2021.

(30) Foreign Application Priority Data

Jul. 9, 2020 (JP) ................ 2020-118468

(51) Int. Cl.
*B41M 5/50* (2006.01)
*B32B 7/02* (2019.01)
(Continued)

(52) U.S. Cl.
CPC ............ *B41M 5/502* (2013.01); *B32B 7/02* (2013.01); *B32B 7/12* (2013.01); *B32B 27/10* (2013.01);
(Continued)

(58) Field of Classification Search
CPC . B41M 5/502; B32B 7/02; B32B 7/12; B32B 27/10; B32B 27/32; B32B 27/08;
(Continued)

(56) References Cited

U.S. PATENT DOCUMENTS

2016/0229605 A1 * 8/2016 Omori ................. B32B 25/08
2017/0100953 A1   4/2017 Aoyagi et al.
(Continued)

FOREIGN PATENT DOCUMENTS

JP   2009061733 A * 3/2009 ............ B41M 5/382
JP   2009-078387 A   4/2009
(Continued)

OTHER PUBLICATIONS

JP 2009061733 A, Thermal Transfer Image Accepting Sheet (English Translation) (Year: 2009).*
(Continued)

*Primary Examiner* — Betelhem Shewareged
(74) *Attorney, Agent, or Firm* — Foley & Lardner LLP

(57) ABSTRACT

A thermal transfer image receiving sheet includes: a substrate made of paper; a polyolefin resin layer formed on a first surface of the substrate; an adhesive layer formed on a second surface of the substrate facing away from the first surface; a porous layer formed on the adhesive layer; a foundation layer formed on the porous layer; and an image receiving layer formed on the foundation layer. A surface of the substrate, as defined in JIS B 0601:2001, has a maximum valley (undulation) depth Wv of 2.00 μm or less and a root mean square slope for the waviness WΔq of 0.013 or less. The porous layer has a thickness of 25 μm or more, and a thickness of the polyolefin resin layer is 0.2 to 3.0 times the thickness of the porous layer.

3 Claims, 1 Drawing Sheet

(51) Int. Cl.
  *B32B 7/12* (2006.01)
  *B32B 27/10* (2006.01)
  *B32B 27/32* (2006.01)
  *B32B 27/08* (2006.01)
(52) U.S. Cl.
  CPC .............. *B32B 27/32* (2013.01); *B32B 27/08* (2013.01); *B32B 2255/10* (2013.01); *B32B 2255/26* (2013.01); *B32B 2255/28* (2013.01); *B32B 2305/026* (2013.01); *B32B 2307/518* (2013.01); *B32B 2307/732* (2013.01)
(58) Field of Classification Search
  CPC ............ B32B 2255/10; B32B 2255/26; B32B 2255/28; B32B 2305/026; B32B 2307/518; B32B 2307/732
  USPC ....................................................... 428/32.39
  See application file for complete search history.

(56) References Cited

U.S. PATENT DOCUMENTS

| | | | |
|---|---|---|---|
| 2020/0307296 A1 | 10/2020 | Hatakeyama et al. | |
| 2022/0253655 A1* | 8/2022 | Abe | .................... H04N 1/6055 |

FOREIGN PATENT DOCUMENTS

| | | | | |
|---|---|---|---|---|
| JP | 2015-193251 A | 11/2015 | | |
| JP | 2019-147310 A | 9/2019 | | |
| JP | 2020-157572 A | 10/2020 | | |
| WO | WO-2019/182106 A1 | 9/2019 | | |
| WO | WO-2019182106 A1 * | 9/2019 | ............. | B41M 5/42 |

OTHER PUBLICATIONS

International Searching Authority, "International Search Report," issued in connection with International Patent Application No. PCT/JP2021/025731, dated Sep. 7, 2021.
International Searching Authority, "Written Opinion," issued in connection with International Patent Application No. PCT/JP2021/025731, dated Sep. 7, 2021.
Mitutoyo, "Surftest (Surface Roughness Testers)", Quick Guide to Precision Measuring Instruments, pp. 38-39, Jis B 0601:2001.
Technical Information, "Surface Roughness (Jis B 0601-2001)", pp. 1-3.
European Extended Search Report issued in corresponding European Patent Application No. 21838289.3 dated Nov. 13, 2023 (7 pages).

* cited by examiner

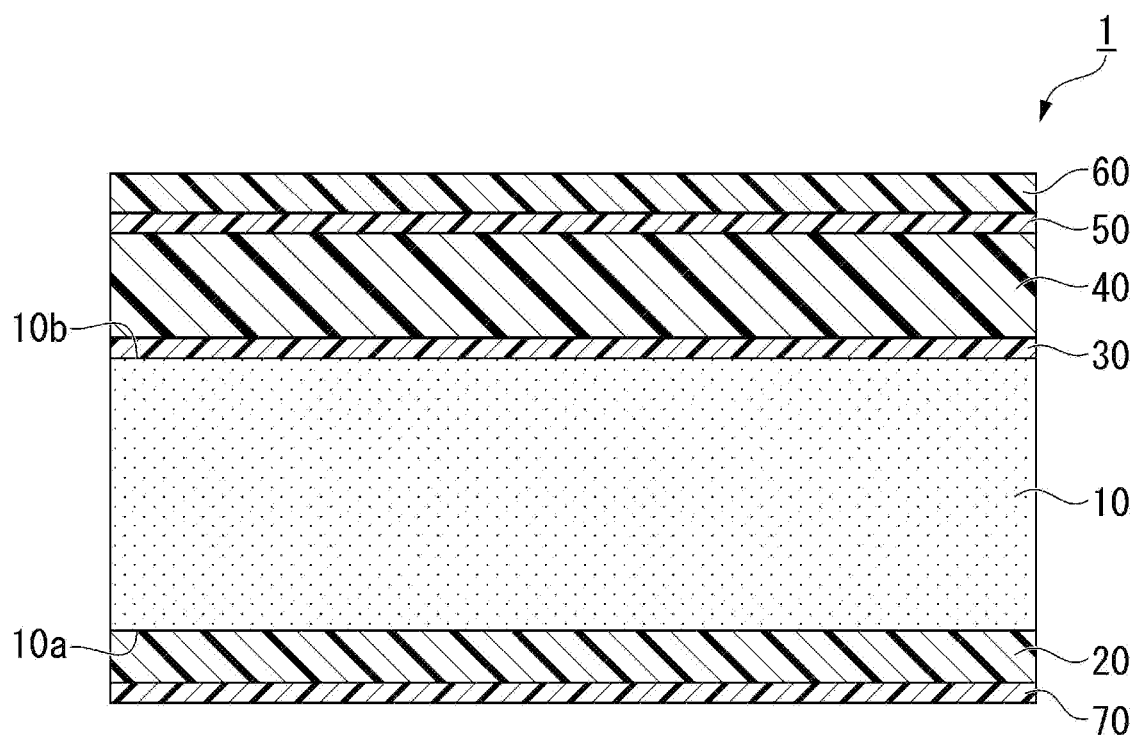

THERMAL TRANSFER IMAGE RECEIVING SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/025731, filed on Jul. 8, 2021, which in turn claims the benefit of JP 2020-118468, filed Jul. 9, 2020, the disclosures of all which are incorporated herein by reference in its entirety.

TECHNICAL FIELD

The present invention relates to a thermal transfer image receiving sheet used for a thermal transfer printer.

BACKGROUND

Known printing methods for forming characters, images, or the like on an object include dye-sublimation thermal transfer and melt thermal transfer. In dye-sublimation thermal transfer, the dye layer of the thermal transfer ribbon and the image receiving layer of the thermal transfer image receiving sheet are stacked, and the thermal transfer ribbon is heated with a thermal head whose heat generation is controlled by an electrical signal. As a result, the dye in the dye layer is sublimated and transferred onto the image receiving layer so that the desired characters, images, or the like are formed thereon.

The dye-sublimation thermal transfer can reproduce natural images relatively faithfully since it uses sublimation-type dyes and can freely adjust the gradation of the natural images. Therefore, thermal transfer image receiving sheets for dye-sublimation thermal transfer are also used as photographic printing paper in various applications such as general printers, amusement machines, and ID photo booths.

Thermal transfer image receiving sheets are often distributed in the form of unit sheets cut for use.

Thermal transfer image receiving sheets are required to have various properties. One of the important properties is the ability to resist curling after the printing. When printing an image on a sheet-type thermal transfer image receiving sheet, the heat of the thermal head is applied to the thermal transfer image receiving sheet. When the thermal transfer image receiving sheet partially shrinks due to the heat, the thermal transfer image receiving sheet may curl up after the printing and form a concave curl shape with the printed side facing up. When the size of the concave curl is large, the thermal transfer image receiving sheet in the printer may become jammed while being conveyed or ejected, or the thermal transfer image receiving sheets may not stack properly after printing.

PTL 1 describes preventing curling by including a substrate and a porous layer, and arranging polyolefin resin layers with different densities and thicknesses on both sides of the substrate.

[Citation List] [Patent Literature] [PTL 1] JP 2015-193251 A.

SUMMARY OF THE INVENTION

Technical Problem

A fundamental step of the technique described in PTL 1 is to attach the porous layer and substrate together using the extrusion lamination method. However, in this case, since the state of curling changes depending on the extrusion temperature, extrusion speed, cooling process, and the like, it is not easy to reliably suppress curling.

In addition, although PTL 1 states that the surface quality of the printed surface is improved by not using an adhesive to attach the porous layer and the substrate together, the inventors of the present application found that the surface quality and print density can be improved even when an adhesive is used to attach the porous layer and the substrate together.

In view of the above circumstances, the present invention provides a thermal transfer image receiving sheet capable of favorably suppressing the concave curling after printing even when an adhesive is used to attach the porous layer and substrate together, and having good printed surface quality and printing density.

Solution to Problem

An aspect of the present invention is a thermal transfer image receiving sheet 1 including: a substrate made of paper; a polyolefin resin layer formed on a first surface of the substrate; an adhesive layer formed on a second surface of the substrate facing away from the first surface; a porous layer formed on the adhesive layer; a foundation layer formed on the porous layer; and an image receiving layer formed on the foundation layer.

A surface of the substrate, as defined in JIS B 0601:2001, has a maximum valley (undulation) depth Wv of 2.00 µm or less and a root mean square slope for the waviness WΔq of 0.013 or less.

The porous layer has a thickness of 25 µm or more, and a thickness of the polyolefin resin layer is 0.2 to 3.0 times the thickness of the porous layer.

Advantageous Effects of the Invention

According to the present invention, a thermal transfer image receiving sheet capable of favorably suppressing the concave curling after printing and having a good print density can be provided.

BRIEF DESCRIPTION OF THE DRAWINGS

FIG. 1 is a schematic cross-sectional view illustrating a thermal transfer image receiving sheet according to an embodiment of the present invention.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

Referring to FIG. 1, an embodiment of the present invention will be described.

FIG. 1 is a schematic cross-sectional view illustrating a thermal transfer image receiving sheet 1 according to the present embodiment. The thermal transfer image receiving sheet 1 includes a sheet substrate 10, a polyolefin resin layer 20 provided on a first surface 10a of the substrate 10, an adhesive layer 30 provided on a second surface 10b of the substrate 10 facing away from the first surface 10a, a porous layer 40 provided on the adhesive layer 30, a foundation layer 50 provided on the porous layer 40, an image receiving layer 60 provided on the foundation layer 50, and a back layer 70 provided on the polyolefin resin layer 20.

The substrate 10 may be any suitable kind of paper. Examples of paper that can be used include high-quality paper, medium-quality paper, coated paper, art paper, and paper laminated with resin. Among them, smooth paper is preferable, and smooth coated paper, particularly glossy paper is preferable. Uncoated high-quality paper or the like having smoothness, such as high-quality photographic printing paper, can also be suitably used.

Regarding the thickness of the substrate 10, considering the stiffness (rigidity), strength, and heat resistance required for printed matter, substrates with a thickness within a range of 25 micrometers (μm) to 250 μm can be used. The thickness may be in the range of 50 μm or more and 200 μm or less.

The resin material for the polyolefin resin layer 20 may contain low-density polyethylene (LDPE) for moldability, or high-density polyethylene (HDPE). The mixture ratio between LDPE and HDPE can be determined as appropriate. For example, it may be 2:8.

The polyolefin resin layer 20 may contain polyethylene having a density of 0.93 g/cm$^3$ or higher. HDPEs are defined as polyethylenes having a density of 0.942 g/cm$^3$ or higher in JIS K 6748:1995, which satisfies this condition. Some LDPEs also satisfy this condition.

In general, the higher the density of resin, the higher the crystallinity. This makes it easier for the spikes of the conveying mechanism of the thermal transfer printer to engage with the resin layer. As a result, displacement of the thermal transfer image receiving sheet can be prevented.

When the density of the polyolefin resin layer 20 is 0.93 g/cm$^3$ or higher, it is possible to maintain a convex curling state where the image receiving layer side becomes convex when curling occurs.

The adhesive layer 30 is a layer for attaching the substrate 10 and the porous layer 40 together by dry lamination. The adhesive forming the adhesive layer 30 can be any adhesive that can be used for dry lamination, and may be an adhesive obtained by dissolving a resin in a solvent system. For example, it may contain a vinyl acetate resin, acrylic resin, vinyl acetate-acrylic copolymer resin, vinyl acetate-vinyl chloride copolymer resin, ethylene-vinyl acetate copolymer resin, polyurethane resin, polyamide resin, polyvinyl acetal resin, or polyester resin. A non-solvent-based adhesive such as a water-based adhesive, hot-melt adhesive, film adhesive, or reactive adhesive can also be used.

The porous layer 40 has a large number of small voids, and provides the thermal transfer image receiving sheet 1 with heat insulation, cushioning, and the like when heat is applied from the thermal head. The resin forming the porous layer 40 is not particularly limited, and a known resin material can be chosen as appropriate. Foamed polypropylene resin can be used for its heat insulation and cushioning properties.

The foundation layer 50 is a layer intended to, among other things, improve adhesion between the porous layer 40 and the image receiving layer 60, and improve storage stability of the thermal transfer image receiving sheet after printing.

The material for the foundation layer 50 may be selected from the various known materials depending on the purpose of use. Examples of the material include polyolefin resin, polyester resin, polyvinyl resin, polyurethane resin, polyacrylic resin, polystyrene resin, polysulfone resin, polyvinyl acetate resin, polyvinyl acetal resin, polyvinyl butyral resin, polyvinyl alcohol resin, and copolymers of these resins, as well as epoxy resin and cellulose resin. These materials may be used alone, or a mixture of two or more types of these materials may be used.

In addition, a filler such as titanium oxide, zinc oxide, magnesium carbonate, calcium carbonate, or the like may be added to the foundation layer 50 in order to impart whiteness and concealability. In order to enhance the whiteness, a stilbene compound, benzimidazole compound, benzoxazole compound, or the like may be added as a fluorescent brightener. In order to improve the lightfastness of the print, a hindered amine compound, hindered phenol compound, benzotriazole compound, benzophenone compound, or the like may be added as an ultraviolet absorber or antioxidant. In order to impart an antistatic property, a cationic acrylic resin, polyaniline resin, another conductive filler, or the like may be added.

A thickness in the range of 0.1 μm or more and 3 μm or less is sufficient for the foundation layer 50, and may be in the range of about 0.2 μm or more and 1.0 μm or less.

One or more of the various known binder resins may be used as the image receiving layer 60. Examples of binder resins include a vinyl chloride-acrylic copolymer, vinyl chloride-vinyl acetate copolymer, vinyl acetate-acrylic copolymer, styrene-acrylic copolymer, vinyl chloride-acrylic-ethylene copolymer, vinyl chloride-acrylic-styrene copolymer, polycarbonate resin, polyester resin, polyamide resin, acrylic resin, cellulose resin, polysulfone resin, polyvinyl chloride resin, polyvinyl acetate resin, polyvinyl acetal resin, polyvinyl butyral resin, polyurethane resin, polystyrene resin, polypropylene resin, polyethylene resin, ethylene-vinyl acetate copolymer resin, and epoxy resin. One of these binder resins, or a mixture of two or more may be used.

A thickness in the range of 0.1 μm or more and 10 μm or less is sufficient for the image receiving layer 60, and may be in the range of about 0.2 μm or more and 8 μm or less. The image receiving layer 60 may contain a film-forming agent, release agent, ultraviolet absorber, antistatic agent, cross-linking agent, fluorescent dye, and/or plasticizer as necessary. In order to further improve the sharpness of the transferred image by improving the whiteness of the receiving layer, it may contain one or more of the various known additives including pigments and fillers such as titanium oxide, zinc oxide, kaolin, clay, calcium carbonate, and fine silica powder.

The back layer 70 may be formed of polyester resin, for example. Silica or another inorganic filler may be mixed in the back layer 70.

The back layer 70 prevents the electrification of the thermal transfer image receiving sheet 1, and prevents deterioration of the handling properties and the occurrence of clogging (jamming) during printing.

The back layer 70 is not essential to the present invention, and may be omitted in consideration of the configuration of the printer to which the thermal transfer image receiving sheet is applied, the degree of friction, and the like.

The inventors focused on the substrate made of paper and conducted various studies. As a result, it was found that, when the following conditions are satisfied, it is possible to achieve both suppression of the concave curling after printing and good image quality, while maintaining sufficient print density. The term "surface quality" means the evaluation of whether the gray highlight image area is even as visually observed by an observer, the dispersed fibers of the underlying paper core material (substrate 10) are not observed from the surface, and the smoothness, texture, and tactile feel are similar to those of full-color silver halide photographic printing paper. The term "concave curling" means the thermal transfer image receiving sheet 1 protruding toward the substrate 10 side (back layer 70 side) (the image receiving layer 60 side becoming recessed).

Before producing the thermal transfer image receiving sheet 1, the surface of the substrate 10, as defined in JIS B 0601:2001, has a maximum valley (undulation) depth Wv of 2.00 μm or less and a root mean square slope for the waviness WΔq of 0.013 or less.

The thickness of the porous layer 40 is 25 μm or more.

The thickness of the polyolefin resin layer 20 is 0.2 to 3.0 times the thickness of the porous layer 40.

The substrate surface of a thermal transfer image receiving sheet 1 of the present embodiment which meets the above conditions has a high smoothness since the maximum valley (undulation) depth Wv and the root mean square slope for the waviness WΔq of the substrate surface are within specified ranges. As a result, it is possible to achieve both suppression of the concave curling after printing and good surface quality. In addition, the print does not have unevenness in density called "mottling", and the print density is also good.

The thermal transfer image receiving sheet of the present invention will be further explained using examples. It should be noted that the description of the examples does not limit the present invention in any way.

Example 1

A biaxially oriented polypropylene porous film (thickness: 25 μm) was used as the porous layer 40. The foundation layer 50 was formed by applying a urethane-based paint (Superflex 120 manufactured by DKS Co. Ltd.) to one side of the porous layer 40 so that the film thickness after drying would be 1 μm. Further, the image receiving layer 60 was formed by applying an ink 1 having the following composition mainly composed of vinyl chloride-vinyl acetate resin to the foundation layer 50 so that the film thickness after drying would be 3 μm. The "X part(s)" specified below indicates the weight ratio of the component contained in the ink.

Ink 1
Vinyl chloride-vinyl acetate copolymer resin (Nissin Chemical Industry Co., Ltd., SOLBIN C), 15 parts
Modified silicone resin (KF-1005 manufactured by Shin-Etsu Chemical Co., Ltd.), 1 part
Toluene, 42 parts
Methyl ethyl ketone (MEK), 42 parts
Glossy paper (basis weight: 180 g/m$^2$) was prepared as the substrate 10. This paper, as defined JIS B 0601:2001, has a maximum valley (undulation) depth Wv of 2.00 μm and a root mean square slope for the waviness WΔq of 0.013.

A polyolefin resin layer 20 having a thickness of 10 μm was formed on one side of the substrate 10 by extruding a resin obtained by mixing an LDPE (density: 0.93 g/cm$^3$) and an HDPE (density: 0.98 g/cm$^3$) at a ratio of 2:8. The back layer 70 was formed by applying 1.0 g/m$^2$ of ink 2 having the following composition to the polyolefin resin layer 20.

Further, 3.0 g/m$^2$ of ink 3 having the following composition was applied to the other side of the substrate 10 to form the adhesive layer 30 formed of a solvent adhesive. The porous layer 40 was attached to the substrate 10 with dry lamination via the adhesive layer 30 to obtain the thermal transfer image receiving sheet of Example 1.

Ink 2
Water-soluble polyester resin (Vylonal MD-1100 manufactured by TOYOBO CO., LTD.), 80 parts
Water, 15 parts
Silica filler (SYLYSIA 380 manufactured by Fuji Silysia Chemical Ltd.), 5 parts Ink 3
Polyester polyol resin (Takelac (registered trademark) A525 manufactured by Mitsui Chemicals, Inc.), 18 parts
Isocyanate resin (Takenate (registered trademark) A56 manufactured by Mitsui Chemicals, Inc.), 2 parts
Ethyl acetate, 80 parts Example 2

A thermal transfer image receiving sheet of Example 2 was prepared in the same manner as in Example 1 except that the thickness of the polyolefin resin layer 20 was changed to 5 μm.

Example 3

A thermal transfer image receiving sheet of Example 3 was prepared in the same manner as in Example 1 except that the thickness of the polyolefin resin layer 20 was changed to 75 μm.

Example 4

A thermal transfer image receiving sheet of Example 4 was prepared in the same manner as in Example 1 except that the thickness of the biaxially oriented porous film forming the porous layer 40 was changed to 45 μm.

Example 5

A thermal transfer image receiving sheet of Example 5 was prepared in the same manner as in Example 4 except that the thickness of the polyolefin resin layer 20 was changed to 135 μm.

Example 6

A thermal transfer image receiving sheet of Example 6 was prepared in the same manner as in Example 1 except that the thickness of the biaxially oriented porous film forming the porous layer 40 was changed to 30 μm.

Example 7

Glossy paper (basis weight: 180 g/m$^2$) was prepared as the substrate 10. This paper, as defined in JIS B 0601:2001, has a maximum valley (undulation) depth Wv of 1.84 μm and a root mean square slope for the waviness WΔq of 0.013.

A layer of LDPE (second polyolefin resin layer) with a thickness of 10 μm was provided on the side (second surface) of this substrate 10 facing away from the back layer, and the adhesive layer 30 was formed thereon. Other than this, the thermal transfer image receiving sheet of Example 7 was obtained in the same manner as in Example 6.

Comparative Example 1

A thermal transfer image receiving sheet of Comparative Example 1 was prepared in the same manner as in Example 6 except that the polyolefin resin layer 20 was not provided.

Comparative Example 2

A thermal transfer image receiving sheet of Comparative Example 2 was formed in the same manner as in Comparative Example 1, except that a layer of LDPE with a thickness of 10 μm was provided on the side (second surface) of the substrate 10 facing away from the back layer, and the adhesive layer 30 was formed thereon.

Comparative Example 3

Glossy paper (basis weight: 180 g/m$^2$) was prepared as the substrate 10. This paper, as defined in JIS B 0601:2001, has a maximum valley (undulation) depth Wv of 2.20 μm and a root mean square slope for the waviness WΔq of 0.015.

A thermal transfer image receiving sheet of Comparative Example 3 was obtained in the same manner as in Comparative Example 1 except that this substrate was used.

Comparative Examples 1 to 3 are examples in which the polyolefin resin layer 20 is not provided.

Comparative Example 4

A thermal transfer image receiving sheet of Comparative Example 4 was prepared in the same manner as in Comparative Example 3 except that a polyolefin resin layer 20 with a thickness of 20 μm was provided.

Comparative Example 5

A thermal transfer image receiving sheet of Comparative Example 5 was obtained in the same manner as in Example 7, except that a polyolefin resin layer 20 having a thickness of 20 μm was provided, and the porous layer and the substrate were joined using extrusion lamination when forming the LDPE layer. That is, Comparative Example 5 does not have the adhesive layer 30 of Example 7, and dry lamination was not performed.

Comparative Example 6

A thermal transfer image receiving sheet of Comparative Example 6 was prepared in the same manner as in Example 1, except that the thickness of the biaxially oriented porous film forming the porous layer 40 was changed to 20 μm, and the thickness of the polyolefin resin layer 20 was changed to 20 μm.

Comparative Example 7

A thermal transfer image receiving sheet of Comparative Example 7 was prepared in the same manner as in Example 1, except that the thickness of the biaxially oriented porous film forming the porous layer 40 was changed to 30 μm, and the thickness of the polyolefin resin layer 20 was changed to 3 μm.

Comparative Example 8

A thermal transfer image receiving sheet of Comparative Example 8 was prepared in the same manner as in Comparative Example 7 except that the thickness of the polyolefin resin layer 20 was changed to 95 μm.

The examples of thermal transfer image receiving sheets were evaluated regarding the following three items.

<Print Density Evaluation>

An 11-step image was printed on the thermal transfer image receiving sheet of each example with a printer (DS40 manufactured by Dai Nippon Printing Co., Ltd.) and the ribbon attached thereto. When the density of the maximum grayscale level (measured according to ISO 13655) was 2.00 or higher, the sheet was rated as A (good), and when it was lower than 2.00, the sheet was rated as B (bad).

<Mottling (Evaluation of Surface Quality)>

A 128 grayscale was printed on the thermal transfer image receiving sheet of each example with a printer (DS40 manufactured by Dai Nippon Printing Co., Ltd.) and the ribbon attached thereto, and the print was visually evaluated regarding the presence of mottling. Specifically, the presence of mottling was checked under a fluorescent lamp with an incident angle of 45 degrees, using reflected light at a slightly shifted angle of 30 degrees instead of specular reflection.

The example was rated as A (good) when no mottling was visually confirmed, and rated as B (bad) when mottling was visually confirmed.

<Evaluation of Curling After Printing>

The thermal transfer image receiving sheet of each example was cut into a photographic printing size of 177 mm×100 mm, and the entire surface was painted black with a sheet-fed printer ("SELPHY" CP1200 manufactured by Canon Inc.). The amount of curling was measured by taking an average of the distances in the thickness direction between four points on the sides of the print (image receiving sheet) and the center of the print in the thickness direction. The sign "−" indicates a concave curling case where the sides are higher than the center, and the sign "+" indicates a convex curling case where the sides are lower than the center. The amount of curling was rated into the following two grades:

A (good): The amount of curling is within the range of ±5 mm.

B (bad): The amount of curling is not within the range of ±5 mm.

A sheet-fed printer was used because it is required that the image receiving sheet be flat without curling during printing, and because curling affects the sheet feeing performance, such as the occurrence of jamming during printing. Therefore, it is suitable as a printer for curling evaluation.

The results are shown in Table 1.

TABLE 1

| | Substrate surface Wv [μm] | WΔq | Thickness of porous layer [μm] | Thickness of polyolefin resin layer [μm] | Presence of polyethylene having density of 0.93 g cm³ or higher | Thickness ratio | Maximum density | Mottling | Curling |
|---|---|---|---|---|---|---|---|---|---|
| Ex. 1 | 2.00 | 0.013 | 25 | 10 | Yes | 0.40 | A | A | A |
| Ex. 2 | 2.00 | 0.013 | 25 | 5 | Yes | 0.20 | A | A | A |
| Ex. 3 | 2.00 | 0.013 | 25 | 75 | Yes | 3.00 | A | A | A |
| Ex. 4 | 2.00 | 0.013 | 45 | 10 | Yes | 0.22 | A | A | A |
| Ex. 5 | 2.00 | 0.013 | 45 | 135 | Yes | 3.00 | A | A | A |
| Ex. 6 | 2.00 | 0.013 | 30 | 10 | Yes | 0.33 | A | A | A |
| Ex. 7 | 1.84 | 0.013 | 30 | 10 | Yes | 0.33 | A | A | A |
| Comp. Ex. 1 | 2.00 | 0.013 | 30 | 0 | No | 0.00 | A | A | B |
| Comp. Ex. 2 | 2.00 | 0.013 | 30 | 0 | No | 0.00 | A | A | B |
| Comp. Ex. 3 | 2.20 | 0.015 | 30 | 0 | No | 0.00 | A | B | B |
| Comp. Ex. 4 | 2.20 | 0.015 | 30 | 20 | Yes | 0.67 | A | B | A |
| Comp. Ex. 5 | 1.84 | 0.013 | 30 | 20 | Yes | 0.67 | A | A | B |
| Comp. Ex. 6 | 2.00 | 0.013 | 20 | 20 | Yes | 1.00 | B | A | A |
| Comp. Ex. 7 | 2.00 | 0.013 | 30 | 3 | Yes | 0.10 | A | A | B |
| Comp. Ex. 8 | 2.00 | 0.013 | 30 | 95 | Yes | 3.17 | A | A | B |

As shown in Table 1, the Examples satisfying the above three points showed good results in all evaluation items.

The Comparative Examples that did not satisfy the above three points showed a poor result in at least one of the evaluation items.

An embodiment of the present invention has been explained above; however, the technical scope of the present invention is not limited to the above embodiments, and it is possible to change the combination of the components, add various modifications to each component, add another component, or delete a component, without departing from the gist of the present invention.

For example, it is sufficient if at least one of the first surface and the second surface of a substrate according to the present invention satisfies the above-described maximum valley (undulation) depth Wv and root mean square slope for the waviness WΔq. The surface satisfying the maximum valley (undulation) depth Wv and root mean square slope for the waviness WΔq may either be the first or second surface.

INDUSTRIAL APPLICABILITY

The thermal transfer image receiving sheet of the present invention can be suitably used for dye-sublimation transfer type printers.

[Reference Signs List] 1 . . . Thermal transfer image receiving sheet; 10 . . . Substrate; 10a . . . First surface; 10b . . . Second surface; 20 . . . Polyolefin resin layer; 30 . . . Adhesive layer; 40 . . . Porous layer; 50 . . . Foundation layer; 60 . . . Image receiving layer.

What is claimed is:

1. A thermal transfer image receiving sheet, comprising:
a substrate made of paper;
a polyolefin resin layer on a first surface of the substrate;
an adhesive layer in direct contact with a second surface of the substrate, the second surface of the substrate facing away from the first surface;
a porous layer on the adhesive layer;
a foundation layer on the porous layer; and
an image receiving layer on the foundation layer,
wherein
a surface of the substrate, as defined in JIS B 0601:2001, has a maximum valley (undulation) depth Wv of 2.00 μm or less and a root mean square slope for the waviness WΔq of 0.013 or less,
the porous layer has a thickness of 25 μm or more,
a thickness of the polyolefin resin layer is 0.2 to 3.0 times the thickness of the porous layer,
the thickness of the polyolefin resin layer from 75 μm to 135 μm, and
the adhesive layer is a dry lamination adhesive layer.

2. The thermal transfer sheet of claim 1, wherein the adhesive layer is formed of an adhesive obtained by dissolving a resin in a solvent system.

3. The thermal transfer sheet of claim 1, wherein the polyolefin resin layer contains polyethylene having a density of 0.93 g/cm³ or higher.

* * * * *